(12) United States Patent
Chang et al.

(10) Patent No.: US 11,345,818 B1
(45) Date of Patent: May 31, 2022

(54) DYE FOR FIBER AND DYEING METHOD

(71) Applicant: INDUSTRIAL TECHNOLOGY RESEARCH INSTITUTE, Hsinchu (TW)

(72) Inventors: Pei-Ching Chang, Zhubei (TW); Chang-Jung Chang, Taoyuan (TW); Ya-Lin Lin, Hsinchu (TW); Yu-Ju Lin, Zhubei (TW); Jhong-De Lin, Kaohsiung (TW); Hsiang-Yuan Chu, Hsinchu (TW); Hung-Yu Liao, Taoyuan (TW); Jie-Len Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/137,148

(22) Filed: Dec. 29, 2020

(51) Int. Cl.
  *D06P 1/00* (2006.01)
  *C09B 7/02* (2006.01)
  *C09B 67/30* (2006.01)
  *D06P 1/22* (2006.01)

(52) U.S. Cl.
  CPC ............ *C09B 7/02* (2013.01); *C09B 67/0078* (2013.01); *D06P 1/228* (2013.01)

(58) Field of Classification Search
  CPC .......... A61Q 5/10; A61Q 5/065; A61K 8/492; A61K 8/922; A61K 8/925; A61K 8/99; C09B 7/02; C09B 67/0078; D06P 1/228
  USPC ............................................................ 8/653
  See application file for complete search history.

(56) References Cited

U.S. PATENT DOCUMENTS

| | | | | |
|---|---|---|---|---|
| 5,034,016 A | * | 7/1991 | Koshida | D06P 1/228 8/653 |
| 5,122,160 A | * | 6/1992 | Koshida | C09B 67/0033 8/638 |
| 5,691,171 A | * | 11/1997 | Oriel | C09B 7/00 435/118 |
| 5,834,297 A | | 11/1998 | Oriel et al. | |
| 5,866,396 A | | 2/1999 | Weyler et al. | |
| 6,190,892 B1 | | 2/2001 | Weyler et al. | |
| 6,303,354 B1 | | 10/2001 | Weyler et al. | |
| 6,524,625 B2 | | 2/2003 | Aga et al. | |
| 6,566,341 B1 | | 5/2003 | Wang et al. | |
| 6,933,315 B2 | | 8/2005 | Wang et al. | |
| 7,582,670 B2 | | 9/2009 | Wang et al. | |
| 7,855,223 B2 | | 12/2010 | Chen et al. | |
| 7,960,155 B1 | | 6/2011 | Hauer et al. | |
| 8,394,847 B2 | | 3/2013 | Wang et al. | |
| 8,563,525 B2 | | 10/2013 | Wang et al. | |
| 8,748,475 B2 | | 6/2014 | Wang et al. | |
| 9,023,885 B2 | | 5/2015 | Wang et al. | |
| 9,962,400 B2 | | 5/2018 | Wang et al. | |
| 10,232,006 B2 | | 3/2019 | Chantalat et al. | |
| 10,287,601 B2 | | 5/2019 | Anterola | |
| 10,555,985 B2 | | 2/2020 | Chantalat et al. | |
| 2008/0229520 A1 | * | 9/2008 | Javet | A61Q 5/10 8/405 |
| 2012/0204357 A1 | * | 8/2012 | Lalleman | A61K 8/35 8/407 |
| 2018/0105977 A1 | | 4/2018 | Nugent et al. | |
| 2020/0207988 A1 | | 7/2020 | Chang et al. | |

FOREIGN PATENT DOCUMENTS

| | | |
|---|---|---|
| KR | 10-1104820 B1 | 1/2012 |
| TW | I240021 B | 9/2005 |
| TW | 202001037 A | 1/2020 |
| TW | I698740 B | 6/2020 |
| TW | I700367 B | 8/2020 |

OTHER PUBLICATIONS

Hartl et al., "Searching for blue: Experiments with woad fermentation vats and an explanation of the colours through dye analysis," Journal of Archaeological Science: Reports, vol. 2, 2015, pp. 9-39.
Safapour et al., "Chitosan-cyanuric chloride hybrid as an efficient novel bio-mordant for improvement of cochineal natural dye absorption on wool yarns," The Journal of The Textile Institute, 2018, pp. 1-8.
Tayade et al., "Extraction of Indigo dye from Couroupita guianensis and its application on cotton fabric," Fashion and Textiles, vol. 1, No. 16, 2014, pp. 1-16.
U.S. Appl. No. 16/731,053, filed Dec. 31, 2019.
Taiwanese Office Action and Search Report for Taiwanese Application No. 109146639, dated Aug. 24, 2021.

* cited by examiner

*Primary Examiner* — Eisa B Elhilo
(74) *Attorney, Agent, or Firm* — Birch, Stewart, Kolasch & Birch, LLP

(57) ABSTRACT

A dyeing method includes immersing a fiber into a dye for dyeing the fiber, in which the dye includes indigo and indirubin, and the indigo and the indirubin have a weight ratio of 20:1 to 80:1. The indigo in the dye has a concentration of 0.1% o.w.f. to 5% o.w.f. The dyed fiber may simultaneously have high luminance, high color saturation, high strength of colorization, and sufficient colorfastness.

15 Claims, No Drawings

DYE FOR FIBER AND DYEING METHOD

TECHNICAL FIELD

The technical field relates to dye, and in particular it relates to a dyeing method utilizing the dye.

BACKGROUND

Indigo is one kind of chemically reducing dyes, which has been used to dye cotton fibers for a long history. Indigo is now mostly obtained by chemical synthesis instead of plant extraction in early stage, and has become an important dye in the production of denim for use in jeans. The indigo color system has its uniqueness. After the cotton yarn is dyed, the dark indigo warp yarn and light gray or white weft yarn are woven into a twill cotton fabric. Alternatively, the dyed cotton yarn can be made into a denim fabric with a change of twill or plain weave.

At present, indigo dyes are often combined with other dyes (such as quinophthalone, benzoquinones, or derivatives thereof) or by-products in the process to increase the color selectivity, so that the overall color presentation has more variation. However, the current indigo dyes still have problems such as insufficient luminance ($L^*$), lack of color saturation, and/or poor colorfastness with regard to dye the fibers.

Accordingly, an indigo-based dye which can simultaneously achieve high luminance, high color saturation, high color strength, and sufficient colorfastness for dyeing the fiber is called for.

SUMMARY

One embodiment of the disclosure provides a dye for dyeing a fiber, including indigo and indirubin, in which the indigo and the indirubin have a weight ratio of 20:1 to 80:1.

In some embodiments, the indigo has a concentration of 0.1% o.w.f. to 5% o.w.f.

In some embodiments, the source of the indigo is microbial synthesis, chemical synthesis, plant extraction, or a combination thereof.

In some embodiments, the source of the indirubin is microbial synthesis, chemical synthesis, plant extraction, or a combination thereof.

In some embodiments, the fiber includes natural fiber, artificial fiber, or a combination thereof.

One embodiment of the disclosure provides a dyeing method, including: immersing a fiber into a dye for dyeing the fiber, in which the dye includes indigo and indirubin, and the indigo and the indirubin have a weight ratio of 20:1 to 80:1

In some embodiments, the dye has a indigo concentration of 0.1% o.w.f. to 5% o.w.f.

In some embodiments, the source of the indigo is microbial synthesis, chemical synthesis, plant extraction, or a combination thereof.

In some embodiments, the source of the indirubin is microbial synthesis, chemical synthesis, plant extraction, or a combination thereof.

In some embodiments, the fiber includes natural fiber, artificial fiber, or a combination thereof.

In some embodiments, the natural fiber includes animal fiber, plant fiber, or a combination thereof.

In some embodiments, the animal fiber includes wool, silk, horse hair, or a combination thereof.

In some embodiments, the plant fiber includes cellulose, cotton, flax, rayon, or a combination thereof.

In some embodiments, the artificial fiber includes polyamide fiber, polyester fiber, or a combination thereof.

In some embodiments, the method further includes treating the fiber with cation before immersing the fiber into the dye for dyeing the fiber.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a dye for dyeing a fiber, including indigo and indirubin, in which the indigo and the indirubin have a weight ratio of 20:1 to 80:1, such as but be not limited to about 25:1 to 75:1, about 30:1 to 70:1, about 35:1 to 65:1, about 40:1 to 60:1, about 20:1 to 40:1, about 30:1 to 50:1, about 40:1 to 60:1, about 50:1 to 70:1, about 60:1 to 80:1, about 25:1, about 30:1, about 35:1, about 40:1, about 45:1, about 50:1, about 55:1, about 60:1, about 65:1, about 70:1, about 75:1, or the like. If the proportion of indigo is too high or too low, the high luminance ($L^*$), the high color saturation (more positive $a^*$ and more negative $b^*$), high strength of colorization (k/s), and high colorfastness cannot be achieved at the same time.

In some embodiments, the indigo has a concentration of 0.1% o.w.f. (on weight of fabric) to 5% o.w.f, such as but be not limited to about 0.5% o.w.f. to 4.5% o.w.f, about 1% o.w.f. to 4% o.w.f., about 1.5% o.w.f. to 3.5% o.w.f., about 2% o.w.f. to 3% o.w.f., about 0.2% o.w.f. to 1.2% o.w.f., about 0.5% o.w.f. to 1.5% o.w.f., about 0.75% o.w.f. to 1.75% o.w.f., about 1.25% o.w.f. to 2.5% o.w.f., about 1.5% o.w.f. to 2.75% o.w.f., about 2.25% o.w.f. to 3.75% o.w.f., about 3.25% o.w.f. to 4.75% o.w.f., about 0.8% o.w.f., about 1.6% o.w.f., about 2.4% o.w.f., about 3.2% o.w.f., about 4.0% o.w.f., about 4.8% o.w.f., or the like. If the indigo concentration is too high, the colorfastness will be poor. If the indigo concentration is too low, the color saturation will be low.

In some embodiments, the source of the indigo can be microbial synthesis, chemical synthesis, plant extraction, or a combination thereof. In some embodiments, the source of the indirubin can be microbial synthesis, chemical synthesis, plant extraction, or a combination thereof. Regardless of the source of the indigo and the indirubin, the above ratio can be used to achieve the dyeing effect.

One embodiment of the disclosure provides a dyeing method, including: immersing a fiber into a dye for dyeing the fiber. For example, the fiber may include natural fiber, artificial fiber, or a combination thereof. The natural fiber may include animal fiber, plant fiber, or a combination thereof. For example, the animal fiber includes wool, silk, horse hair, or a combination thereof. The plant fiber includes cellulose, cotton, flax, rayon, or a combination thereof. The artificial fiber can be polyamide fiber, polyester fiber, another suitable artificial fiber, or a combination thereof.

In some embodiments, the dyeing method further includes treating the fiber with cation before immersing the fiber into the dye for dyeing the fiber. The method of treating the fiber with cation to increase the dyeing effect can be referred to Taiwan Patent No. TWI696740, and the detailed description is not repeated here.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In following Examples, the luminance (L*), red color (a*), and blue color (b*) of the dyed fibers were measured according to Journal of The Textile Institute, Vol. 110, 2019, pages 81-88. The strength of colorization (k/s) of the dyed fibers was measured according to Journal of The Textile Institute, Vol. 110, 2019, pages 81-88. The colorfastness to washing of the dyed fibers was measured according to the standard AATCC61. The colorfastness to dry and wet crocking of the dyed fibers were measured according to the standard AATCC8.

Example 1-1

2% o.w.f. of indigo (commercially available from Sigma-Aldrich) and 0.33% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 6:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had L* of 27.75, a* of 1.47, b* of −19.29, k/s of 19.5, colorfastness to washing of 1-2, colorfastness to dry crocking of 2, and colorfastness to wet crocking of 1-2.

Example 1-2

2% o.w.f. of indigo (commercially available from Sigma-Aldrich) and 0.20% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of 10:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had L* of 27.90, a* of 1.76, b* of −19.05, k/s of 18.8, colorfastness to washing of 2-3, colorfastness to dry crocking of 2, and colorfastness to wet crocking of 1-2.

Example 1-3

2% o.w.f. of indigo (commercially available from Sigma-Aldrich) and 0.1% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of 20:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had L* of 28.75, a* of 1.65, b* of −18.59, k/s of 19.8, colorfastness to washing of 3-4, colorfastness to dry crocking of 3-4, and colorfastness to wet crocking of 3-4.

Example 1-4

2% o.w.f. of indigo (commercially available from Sigma-Aldrich) and 0.07% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 30:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had L* of 27.29, a* of 1.56, b* of −18.79, k/s of 19.2, colorfastness to washing of 3-4, colorfastness to dry crocking of 3-4, and colorfastness to wet crocking of 3-4.

Example 1-5

2% o.w.f. of indigo (commercially available from Sigma-Aldrich) and 0.006% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 303:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had L* of 26.59, a* of −0.32, b* of −16.56, k/s of 17.8, colorfastness to washing of 3-4, colorfastness to dry crocking of 3-4, and colorfastness to wet crocking of 3-4.

As determined in Examples 1-3 and 1-4, when the indigo and the indirubin had a weight ratio of 20:1 to 80:1, the higher luminance (L*), the higher color saturation (more positive a* and more negative b*), good strength of colorization (k/s), and higher colorfastness could be achieved at the same time. If the proportion of indigo is too low (e.g. Examples 1-1 and 1-2), the colorfastness would be poor. If the proportion of indigo is too high (e.g. Example 1-5), the color saturation and the strength of colorization (k/s) would be low.

Example 2-1

1% o.w.f. of indigo (commercially available from Sigma-Aldrich) and 0.166% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 6:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 32.14, $a^*$ of 1.84, $b^*$ of −18.98, k/s of 13.4, colorfastness to washing of 1-2, colorfastness to dry crocking of 2, and colorfastness to wet crocking of 1-2.

Example 2-2

1% o.w.f. of indigo (commercially available from Sigma-Aldrich) and 0.1% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of 10:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 30.87, $a^*$ of 1.93, $b^*$ of −20.71, k/s of 13.9, colorfastness to washing of 3-4, colorfastness to dry crocking of 2-3, and colorfastness to wet crocking of 1-2.

Example 2-3

1% o.w.f. of indigo (commercially available from Sigma-Aldrich) and 0.05% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of 20:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 31.33, $a^*$ of 1.91, $b^*$ of −21.25, k/s of 13.8, colorfastness to washing of 3-4, colorfastness to dry crocking of 3-4, and colorfastness to wet crocking of 3-4.

Example 2-4

1% o.w.f. of indigo (commercially available from Sigma-Aldrich) and 0.033% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 30:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 31.34, $a^*$ of 2.07, $b^*$ of −21.14, k/s of 14.1, colorfastness to washing of 3-4, colorfastness to dry crocking of 4, and colorfastness to wet crocking of 3-4.

Example 2-5

1% o.w.f. of indigo (commercially available from Sigma-Aldrich) and 0.002% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of 50:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 30.37, $a^*$ of 1.85, $b^*$ of −20.27, k/s of 14.7, colorfastness to washing of 4, colorfastness to dry crocking of 4, and colorfastness to wet crocking of 3-4.

Example 2-6

1% o.w.f. of indigo (commercially available from Sigma-Aldrich) and 0.0125% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of 80:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 29.75, $a^*$ of 1.81, $b^*$ of −20.54, k/s of 13.5, colorfastness to washing of 4, colorfastness to dry crocking of 4, and colorfastness to wet crocking of 3-4.

Example 2-7

1% o.w.f. of indigo (commercially available from Sigma-Aldrich) and 0.0033% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 303:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 28.69, $a^*$ of 1.49, $b^*$ of −19.15, k/s of 12.9, colorfastness to washing of 4, colorfastness to dry crocking of 4, and colorfastness to wet crocking of 3-4.

As determined in Examples 2-3 to 2-6, when the indigo concentration was low (e.g. 1% o.w.f.) and the indigo and indirubin had a weight ratio of 20:1 to 80:1, the higher luminance ($L^*$), the higher color saturation (more positive $a^*$ and more negative $b^*$), good strength of colorization (k/s), and good colorfastness could be also achieved at the same time. If the proportion of indigo is too low (e.g. Examples 2-1 and 2-2), the colorfastness would be poor. If the proportion of indigo is too high (e.g. Example 2-7), the luminance, color saturation, and the strength of colorization (k/s) would be low.

Example 3-1

2% o.w.f. of indigo (commercially available from Sigma-Aldrich) and 0.07% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 30:1. 100% of cotton fabric (32's×32's plain woven) was firstly modified by cationic treatment according to the method disclosed in Example 1 of Taiwan Patent No. 1696740, and then immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 20.62, $a^*$ of 2.69, $b^*$ of −24.35, k/s of 23.4, colorfastness to washing of 3-4, colorfastness to dry crocking of 3-4, and colorfastness to wet crocking of 3-4.

Example 3-2

2% o.w.f. of indigo (commercially available from Sigma-Aldrich) and 0.006% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 303:1. 100% of cotton fabric (32's×32's plain woven) was firstly modified by cationic treatment according to the method disclosed in Example 1 of Taiwan Patent No. 1696740, and then immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. The dyed cotton fabric had $L^*$ of 21.34, $a^*$ of 2.52, $b^*$ of −24.13, k/s of 22.8, colorfastness to washing of 3-4, colorfastness to dry crocking of 4, and colorfastness to wet crocking of 3.

As revealed by the comparison between Examples 3-1 and 1-4 and the comparison between Examples 3-2 and 1-5, compared with the plain woven cotton fabric dyed by the indigo and the indirubin without cationic pretreatment (Examples 1~4 and 1-5), the 100% of cotton fabric (32's×32's plain woven) pretreated with cation and then dyed by the indigo and the indirubin (Examples 3-1 and 3-2) had significantly improved strength of colorization (k/s).

Example 4-1

2% o.w.f. of indigo (commercially available from Sigma-Aldrich) and 0.06% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 30:1. A polyamide fabric (Nylon 40D/51F) was immersed into the dye solution, then heated to 105° C. and kept at 105° C. for 0.5 hours, and then cooled. The polyamide fabric was taken out of the dye solution and oxidized in air for 10 minutes, and then washed and baking dried to obtain a dyed polyamide fabric. The dyed polyamide fabric had $L^*$ of 26.3, $a^*$ of 2.6, $b^*$ of −23.5, k/s of 20.1, colorfastness to washing of 4-5, colorfastness to dry crocking of 3-4, and colorfastness to wet crocking of 3.

Example 4-2

2% o.w.f. of indigo (commercially available from Sigma-Aldrich) and 0.006% o.w.f. of indirubin (commercially available from Angen) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 303:1. A polyamide fabric (Nylon 40D/51F) was immersed into the dye solution, then heated to 105° C. and kept at 105° C. for 0.5 hours, and then cooled. The polyamide fabric was taken out of the dye solution and oxidized in air for 10 minutes, and then washed and baking dried to obtain a dyed polyamide fabric. The dyed polyamide fabric had $L^*$ of 23.0, $a^*$ of 2.2, $b^*$ of −22.5, k/s of 19.4, colorfastness to washing of 4-5, colorfastness to dry crocking of 3-4, and colorfastness to wet crocking of 3-4.

As revealed by the comparison between Examples 4-1 and 4-2, when the indigo and the indirubin had a weight ratio of 20:1 to 80:1 (e.g. 30:1), the higher luminance ($L^*$), the higher color saturation, and the higher strength of colorization (k/s) of the dyed polyamide fabric could be achieved at the same time. If the proportion of indigo is too high (e.g. Example 4-2), the luminance, the color saturation, and the strength of colorization (k/s) would be low.

Example 5

2% o.w.f. of indigo (derived from microbial synthesis, as disclosed in Taiwan Patent No. TWI700367) and indirubin (derived from microbial synthesis, as disclosed in Bioresource Technology 102 (2011) 9193-9198) were added to water, and 8 g/L of sodium hydroxide and 40 g/L of sodium dithionite were added to water to chemically reduce the indigo and indirubin for obtaining a dye solution. In the dye solution, the indigo and the indirubin had a weight ratio of about 31:1. 100% of cotton fabric (32's×32's plain woven) was immersed into the dye solution, then heated to 50° C. and kept at 50° C. for 1 hour, and then cooled. The cotton fabric was taken out of the dye solution and oxidized in air for 10 minutes, and then washed and baking dried to obtain a dyed cotton fabric. which had $L^*$ of 29.31, $a^*$ of 1.36, $b^*$ of −20.21, k/s of 15.68, colorfastness to washing of 3-4, colorfastness to dry crocking of 3-4, and colorfastness to wet crocking of 3-4.

As determined in Example 5, when the sources of the indigo and the indirubin are microbial synthesis and the indigo and the indirubin has a weight ratio of 20:1 to 80:1 (e.g. 31:1), the excellent luminance ($L^*$), the good strength of colorization (k/s), and the good colorfastness could be also achieved at the same time.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:
1. A dye for dyeing a fiber, comprising:
indigo and indirubin,
wherein the indigo and the indirubin have a weight ratio of 20:1 to 50:1.
2. The dye for dyeing the fiber as claimed in claim 1, wherein the indigo has a concentration of 0.1% o.w.f. to 5% o.w.f.
3. The dye for dyeing the fiber as claimed in claim 1, wherein a source of the indigo is microbial synthesis, chemical synthesis, plant extraction, or a combination thereof.

4. The dye for dyeing the fiber as claimed in claim 1, wherein a source of the indirubin is microbial synthesis, chemical synthesis, plant extraction, or a combination thereof.

5. The dye for dyeing the fiber as claimed in claim 1, wherein the fiber comprises natural fiber, artificial fiber, or a combination thereof.

6. A dyeing method, comprising:
immersing a fiber into a dye for dyeing the fiber, wherein the dye comprises indigo and indirubin, and the indigo and the indirubin have a weight ratio of 20:1 to 50:1.

7. The method as claimed in claim 6, wherein the dye has a indigo concentration of 0.1% o.w.f. to 5% o.w.f.

8. The method as claimed in claim 6, wherein the source of the indigo is microbial synthesis, chemical synthesis, plant extraction, or a combination thereof.

9. The method as claimed in claim 6, wherein the source of the indirubin is microbial synthesis, chemical synthesis, plant extraction, or a combination thereof.

10. The method as claimed in claim 6, wherein the fiber comprises natural fiber, artificial fiber, or a combination thereof.

11. The method as claimed in claim 10, wherein the natural fiber comprises animal fiber, plant fiber, or a combination thereof.

12. The method as claimed in claim 11, wherein the animal fiber comprises wool, silk, horse hair, or a combination thereof.

13. The method as claimed in claim 11, wherein the plant fiber comprises cellulose, cotton, flax, rayon, or a combination thereof.

14. The method as claimed in claim 10, wherein the artificial fiber comprises polyamide fiber, polyester fiber, or a combination thereof.

15. The method as claimed in claim 6, further comprising treating the fiber with cation before immersing the fiber into the dye for dyeing the fiber.

\* \* \* \* \*